(12) United States Patent
Liao et al.

(10) Patent No.: US 11,408,122 B2
(45) Date of Patent: Aug. 9, 2022

(54) TOUCH DISPLAY LEATHER AND LEATHER STRUCTURE

(71) Applicant: NAN YA PLASTICS CORPORATION, Taipei (TW)

(72) Inventors: Te-Chao Liao, Taipei (TW); Chun-Che Tsao, Taipei (TW); Jhen-Rong Syu, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 0 days.

(21) Appl. No.: 17/191,862

(22) Filed: Mar. 4, 2021

(65) Prior Publication Data

US 2021/0332528 A1    Oct. 28, 2021

(30) Foreign Application Priority Data

Apr. 24, 2020 (TW) ................. 109113716

(51) Int. Cl.
*G06F 3/041* (2006.01)
*D06N 3/00* (2006.01)
(Continued)

(52) U.S. Cl.
CPC ........... *D06N 3/144* (2013.01); *D06N 3/0043* (2013.01); *D06N 3/0063* (2013.01); *D06N 3/0065* (2013.01); *D06N 3/145* (2013.01); *G02F 1/133524* (2013.01); *G02F 1/133603* (2013.01); *G06F 3/0412* (2013.01); *B60K 35/00* (2013.01); *B60K 2370/1438* (2019.05); *G02F 2202/022* (2013.01); *G02F 2202/04* (2013.01); *G02F 2202/16* (2013.01); *G06F 2203/04102* (2013.01)

(58) Field of Classification Search
CPC .... D06N 3/144; D06N 3/0043; D06N 3/0063; D06N 3/0065; D06N 3/145; G02F 1/133603
See application file for complete search history.

(56) References Cited

U.S. PATENT DOCUMENTS 10,875,430 B2 * 12/2020 Bailey ................. B60R 16/0207
11,061,475 B2 * 7/2021 Galan Garcia ....... B60R 16/037
(Continued)

FOREIGN PATENT DOCUMENTS

CN       105765497 A     7/2016
CN       108698368 A    10/2018
(Continued)

*Primary Examiner* — Ricardo Osorio
(74) *Attorney, Agent, or Firm* — Li & Cai Intellectual Property (USA) Office (57) ABSTRACT

A touch display leather and a leather structure thereof are provided. The leather structure includes a diffusion layer, a foam layer and a fabric layer. The diffusion layer includes optical powder dispersed therein. The foam layer is disposed on the diffusion layer, and the foam layer is foamed to provide a leather feel. The fabric layer is disposed on the foam layer, and the fabric layer is color-matched and embossed to present a leather pattern. Base materials of the diffusion layer, the foam layer, and the fabric layer are all at least one material selected from the group consisting of polyvinyl chloride (PVC), polyurethane (PU), and polyolefin (PO), and the leather structure has a light transmittance between 2% and 30%.

9 Claims, 7 Drawing Sheets

(51) Int. Cl.
 *B60K 35/00* (2006.01)
 *D06N 3/14* (2006.01)
 *G02F 1/1335* (2006.01)
 *G02F 1/13357* (2006.01)

(56) References Cited

U.S. PATENT DOCUMENTS

| | | |
|---|---|---|
| 11,216,102 B2 * | 1/2022 | Dworman .............. A47B 97/00 |
| 11,225,191 B2 * | 1/2022 | Ali .......................... B62D 1/06 |
| 2010/0226539 A1 | 9/2010 | Ishii |
| 2011/0096025 A1 | 4/2011 | Slobodin |

FOREIGN PATENT DOCUMENTS

| | | | | |
|---|---|---|---|---|
| CN | 110001511 A | * | 7/2019 | ............ B60K 35/00 |
| CN | 110140098 A | | 8/2019 | |
| KR | 20210039740 A | * | 10/2019 | ............ D06N 3/183 |
| TW | M567182 U | | 9/2018 | |

* cited by examiner

TOUCH DISPLAY LEATHER AND LEATHER STRUCTURE

CROSS-REFERENCE TO RELATED PATENT APPLICATION

This application claims the benefit of priority to Taiwan Patent Application No. 109113716, filed on Apr. 24, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a touch display leather, and more particularly to a touch display leather and a leather structure thereof.

BACKGROUND OF THE DISCLOSURE

Conventional lighting equipment and touch display panels used in automobiles are all hardware devices that cannot be applied to curved objects, such as door trims, roofs, and front seat backs in the interior of automobiles. Furthermore, there is no related product commercially available on the market that has both a leather appearance and a touch display function.

SUMMARY OF THE DISCLOSURE

In response to the above-referenced technical inadequacies, the present disclosure provides a touch display leather and a leather structure thereof.

In one aspect, the present disclosure provides a touch display leather which includes a touch structure and a leather structure. The touch structure includes a backlight module and a touch module. The backlight module is configured to selectively provide a light source for displaying a display signal. The touch module is disposed on the backlight module, and the touch module includes an electrically conductive pattern to provide a touch function. The leather structure includes a diffusion layer, a foam layer, and a fabric layer. The diffusion layer is disposed on the touch module, and the diffusion layer includes optical powder dispersed therein. The foam layer is disposed on the diffusion layer, and the foam layer is foamed to provide a leather feel. The fabric layer is disposed on the foam layer, and the fabric layer is color-matched and embossed to present a leather pattern. When the backlight module selectively provides the light source, the light source is capable of sequentially passing through the touch module, the diffusion layer, the foam layer, and the fabric layer to present the display signal on the fabric layer. The optical powder dispersed in the diffusion layer is capable of optically diffusing the light source. When the backlight module does not provide the light source, the leather structure is capable of shielding the touch structure, and the leather structure is capable of presenting the leather pattern through the fabric layer.

Preferably, the touch structure is a flexible touch structure and the leather structure is a flexible leather structure so that the touch display leather is capable of being disposed on a curved object.

Preferably, in the leather structure, base materials of the diffusion layer, the foam layer, and the fabric layer are all at least one material selected from the group consisting of polyvinyl chloride (PVC), polyurethane (PU), and polyolefin (PO), and the leather structure has a light transmittance between 2% and 30%.

Preferably, the diffusion layer has a thickness between 2 μm and 200 μm, and the optical powder in the diffusion layer is at least one material selected from the group consisting of diffusion powder, pearl powder, and phosphor powder.

Preferably, the optical powder in the diffusion layer has an average particle size between 0.5 μm and 5.0 μm, and a content range of the optical powder in the diffusion layer is between 1.0 wt % and 30.0 wt %.

Preferably, the foam layer is a foamed material, in which a ratio of a thickness of the foam layer after being foamed to a thickness of the foam layer before being foamed is defined as a foaming ratio, and the foaming ratio of the foam layer is between 105% and 180%, in which the foam layer has a thickness between 50 μm and 400 μm after being foamed.

Preferably, the fabric layer has a thickness between 10 μm and 200 μm, the fabric layer includes a color dye dispersed therein, a content range of the color dye in the fabric layer is not greater than 30 wt %, and a side surface of the fabric layer away from the foam layer is embossed or engraved, so that the fabric layer is color-matched and embossed to present the leather pattern.

Preferably, in the touch structure, the backlight module includes a backlight unit and a light guide film disposed on a side surface of the backlight unit, in which the backlight unit is at least one of a light emitting diode (LED), an organic light emitting diode (OLED), and an electroluminescent (EL) light panel, and the light guide film includes at least one material selected from the group consisting of poly(methyl-methacrylate) (PMMA) and polycarbonate (PC).

Preferably, in the touch structure, the touch module further includes a base film, and the electrically conductive pattern is formed on a side surface of the base film, in which the base film includes at least one material selected from the group consisting of polyester (PET) and polycarbonate (PC), and the electrically conductive pattern is formed by printing a conductive ink.

In another aspect, the present disclosure provides a leather structure of a touch display leather. The leather structure includes a diffusion layer, a foam layer and a fabric layer. The diffusion layer includes optical powder dispersed therein. The foam layer is disposed on the diffusion layer, and the foam layer is foamed to provide a leather feel. The fabric layer is disposed on the foam layer, and the fabric layer is color-matched and embossed to present a leather pattern. Base materials of the diffusion layer, the foam layer, and the fabric layer are all at least one material selected from the group consisting of polyvinyl chloride (PVC), polyurethane (PU), and polyolefin (PO), and the leather structure has a light transmittance between 2% and 30%.

Therefore, by virtue of "the structural design, material design, and connection relationship of the touch structure and the leather structure", the touch display leather has balanced light transmittance and shielding properties, so that the applicability of the touch display leather is greatly improved.

Further, since the touch structure is a flexible touch structure and the leather structure is a flexible leather structure, the touch display leather as a whole has flexibility and can be disposed on a curved object, such as a door trim, a roof, and a front seat back of an automobile, or can be disposed on a curved portion of a wallet or a bag.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Touch Display Leather

Referring to FIG. 1 to FIG. 9, embodiments of the present disclosure are illustrated. It should be noted that the relevant quantities and appearances mentioned in the corresponding drawings of the embodiments are only used to specifically illustrate the embodiments of the present disclosure in order to facilitate understanding of the contents of the present disclosure, and is not intended to limit the scope of the present disclosure.

As shown in FIG. 1 to FIG. 4, a touch display leather E is provided in the present embodiment. The touch display leather E includes a touch structure 10 and a leather structure 20, and the leather structure 20 is disposed on a side surface of the touch structure 10. The touch structure 10 is configured to provide a light source and a touch function.

Figure 2:
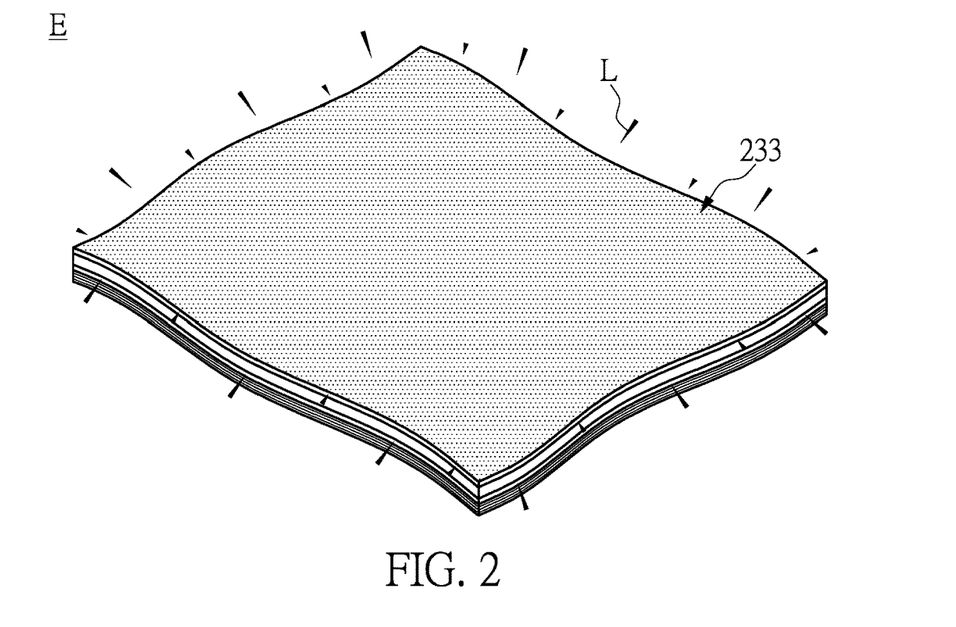
FIG. 2 is a schematic view of the touch display leather of FIG. 1 providing a light source.

When the touch structure 10 is in an activated state to provide the light source L, the light source L can pass through the leather structure 20 to present a display signal 233 as shown in FIG. 2. The display signal 233 may be, for example, an illumination signal, a text signal, a graphic signal, or a human-computer interaction interface signal, and the present disclosure is not limited thereto.

Figure 1:
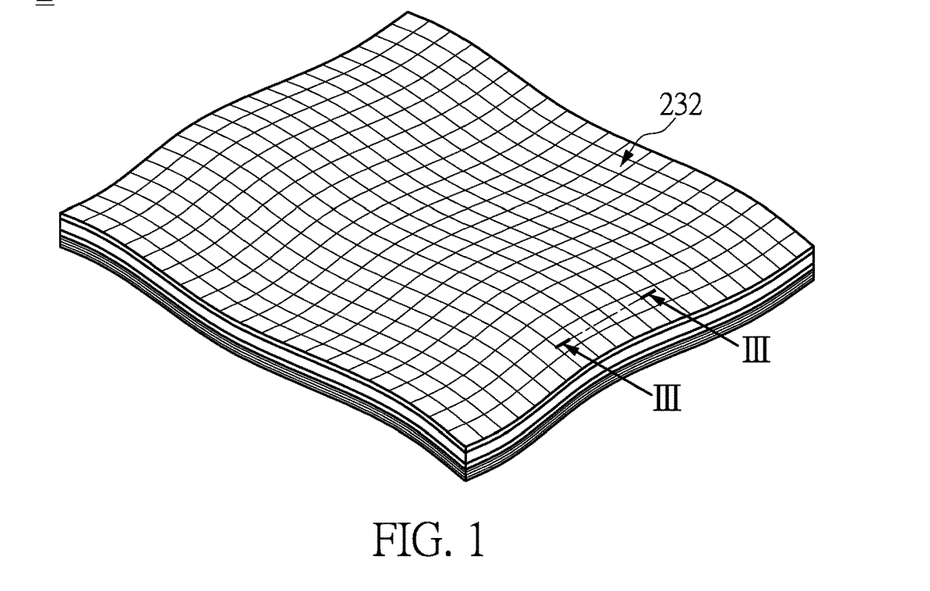
FIG. 1 is a perspective view of a touch display leather according to an embodiment of the present disclosure.

In addition, when the touch structure 10 is in a closed state and the light source L is not provided, the leather structure 20 can shield the touch structure 10 and present a leather pattern 232 as shown in FIG. 1.

Figure 7:
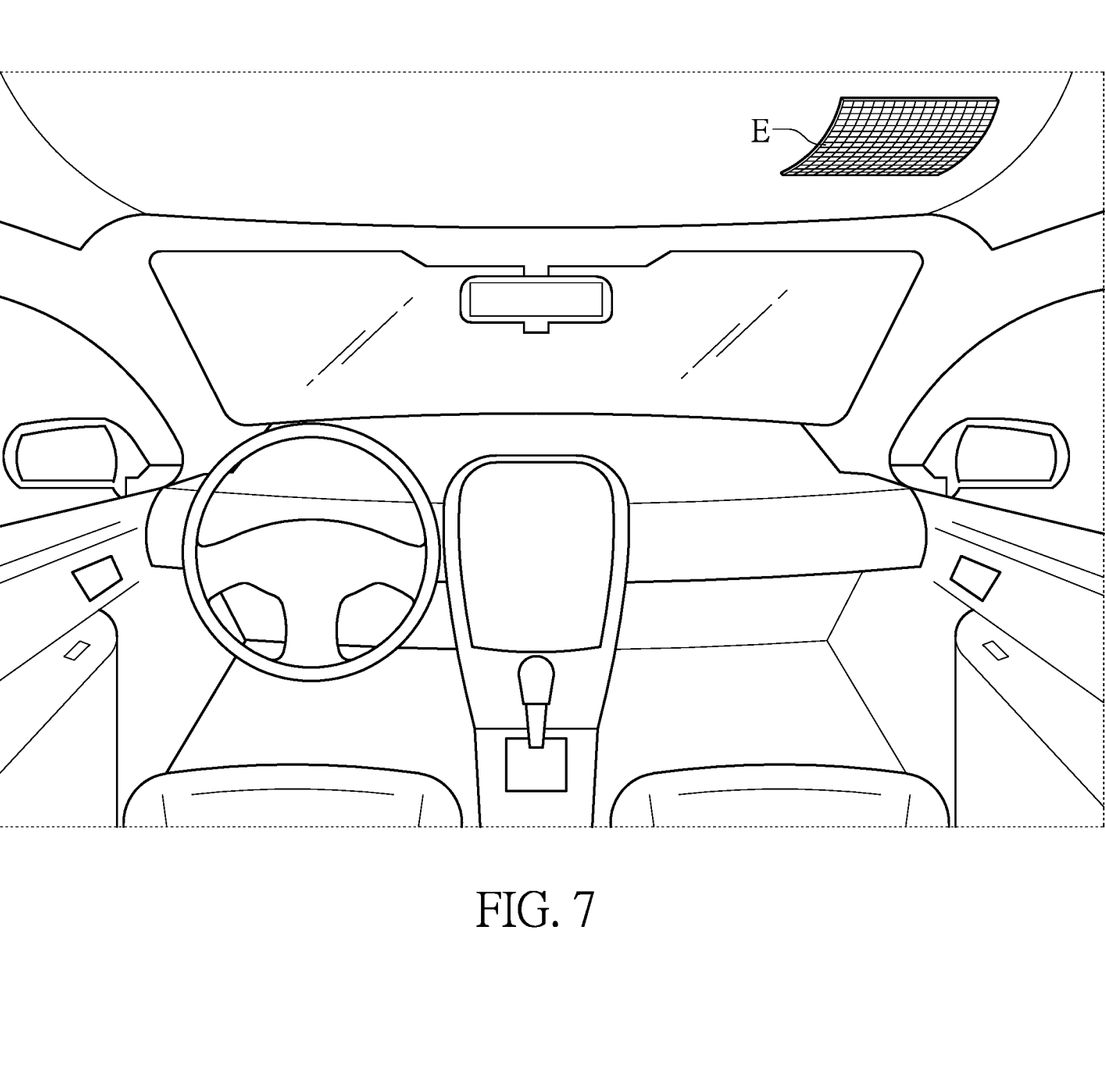
FIG. 7 is a schematic view according to a first application scenario of the touch display leather.
Figure 8:
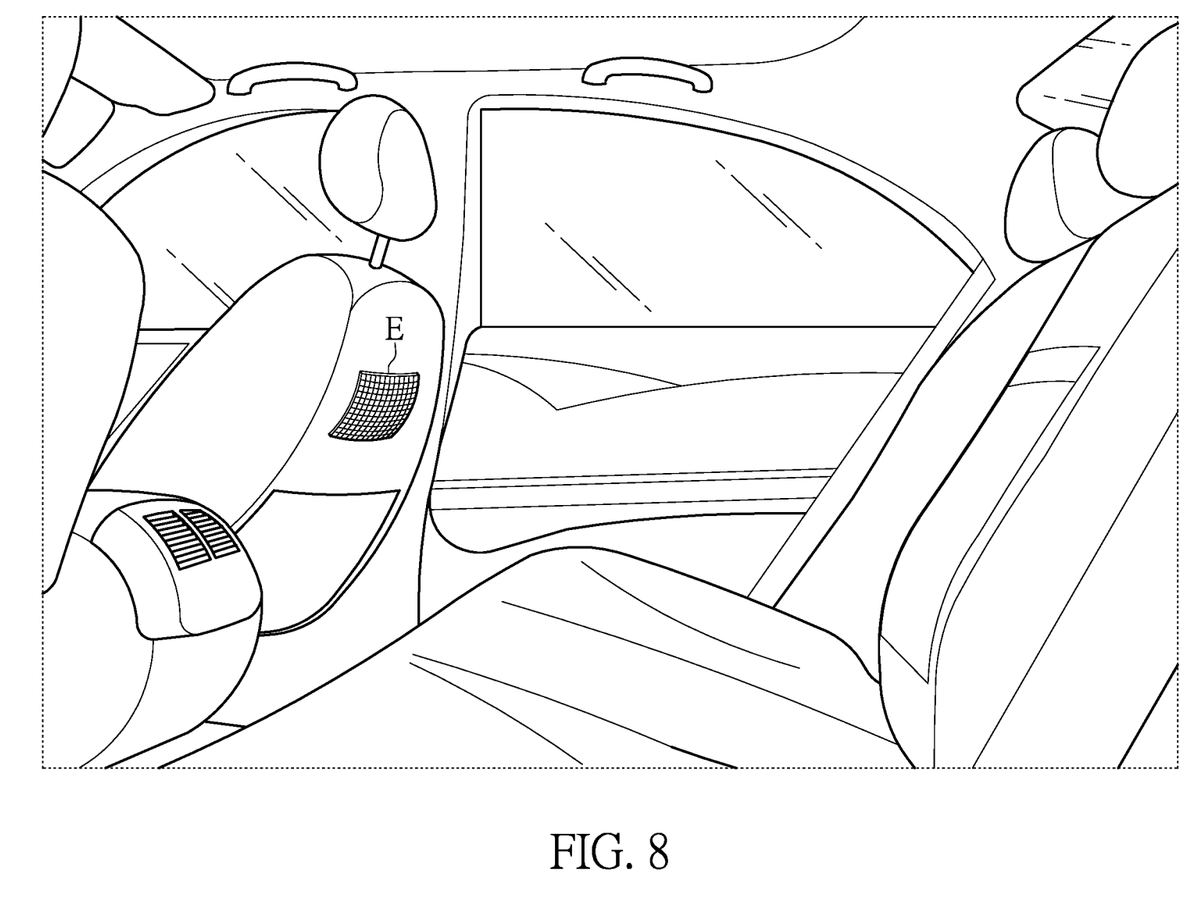
FIG. 8 is a schematic view according to a second application scenario of the touch display leather.
Figure 9:
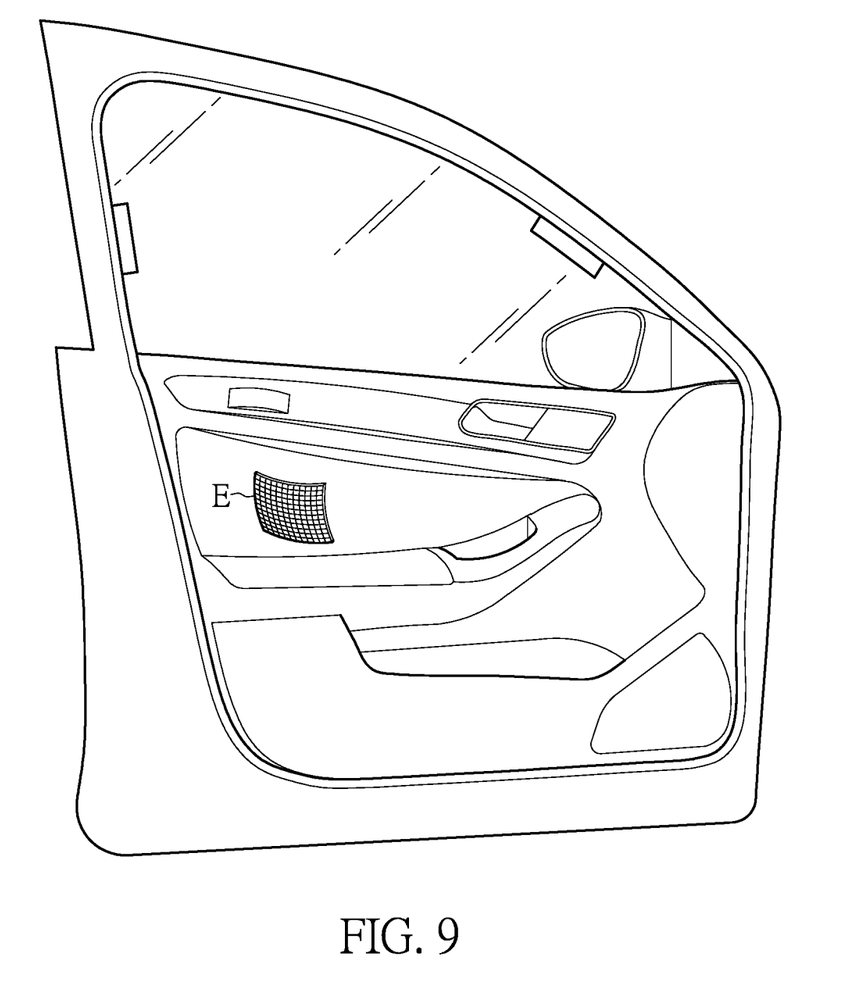
FIG. 9 is a schematic view according to a third application scenario of the touch display leather.

It is worth mentioning that, in the present embodiment, the touch structure 10 is a flexible touch structure 10, and the leather structure 20 is a flexible leather structure 20, so that the touch display leather E as a whole has flexibility and can be disposed on a curved object, such as a door trim, a roof, and a front seat back of an automobile as shown in FIG. 7 to FIG. 9.

The specific structure of each member of the touch display leather E of the present embodiment will be individually described below, and then the connection relationship between the various members of the touch display leather E will be described in due course.

Figure 3:
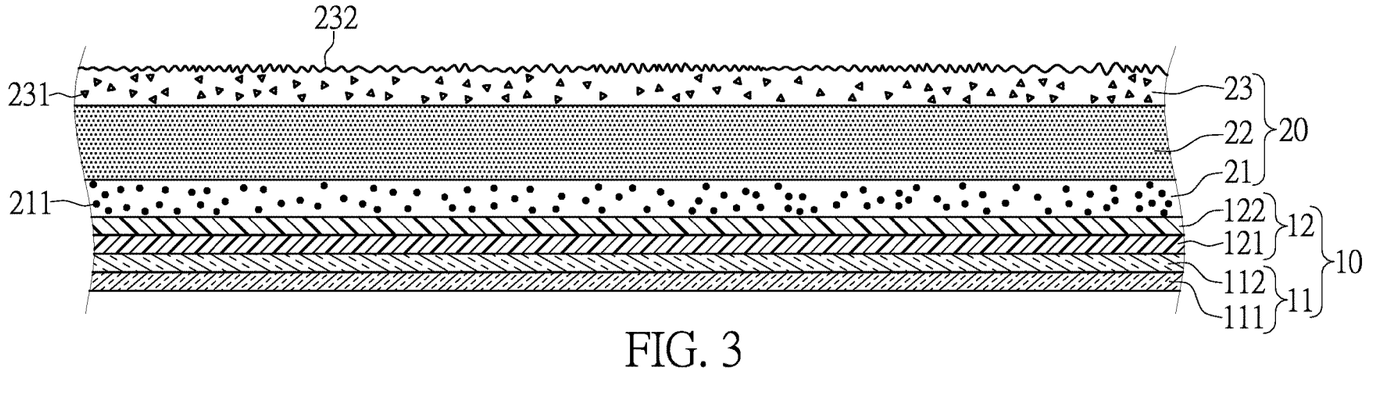
FIG. 3 is a cross-sectional view of FIG. 1 taken along a line III-III.

As shown in FIG. 3, a cross-sectional view of FIG. 1 taken along a line III-III is illustrated. As mentioned above, the touch structure 10 is configured to provide a light source and a touch function.

More specifically, the touch structure 10 includes a backlight module 11 and a touch module 12. In an embodiment of the present disclosure, the backlight module 11 is located at a bottom layer of the touch display leather E, and the touch module 12 is disposed on a side surface of the backlight module 11, but the present disclosure is not limited thereto. For example, the touch structure 10 may further include other elements, such as an optical diffusion film disposed between the backlight module 11 and the touch module 12.

Figure 4:
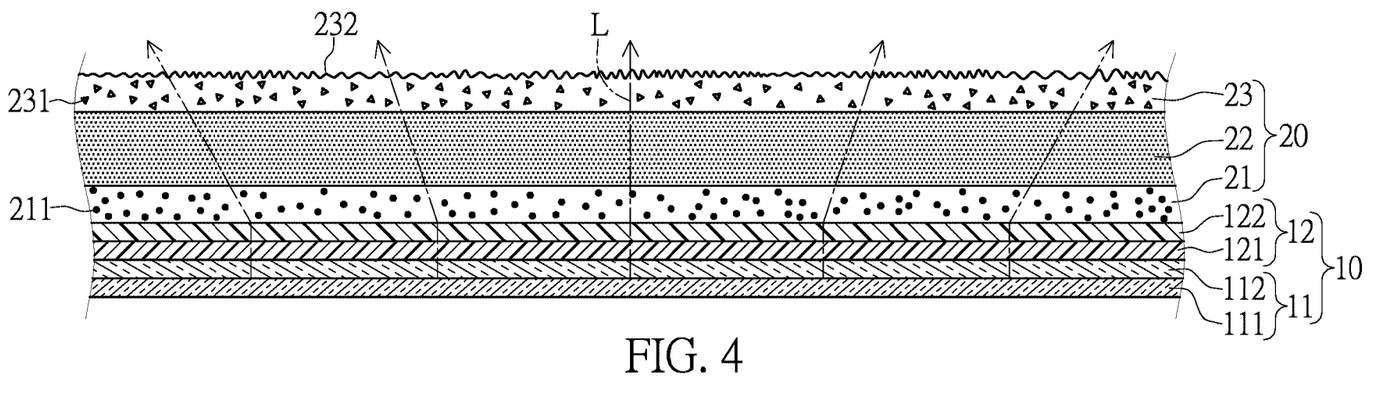
FIG. 4 is a schematic view of the touch display leather of FIG. 3 providing a light source.
Figure 5:
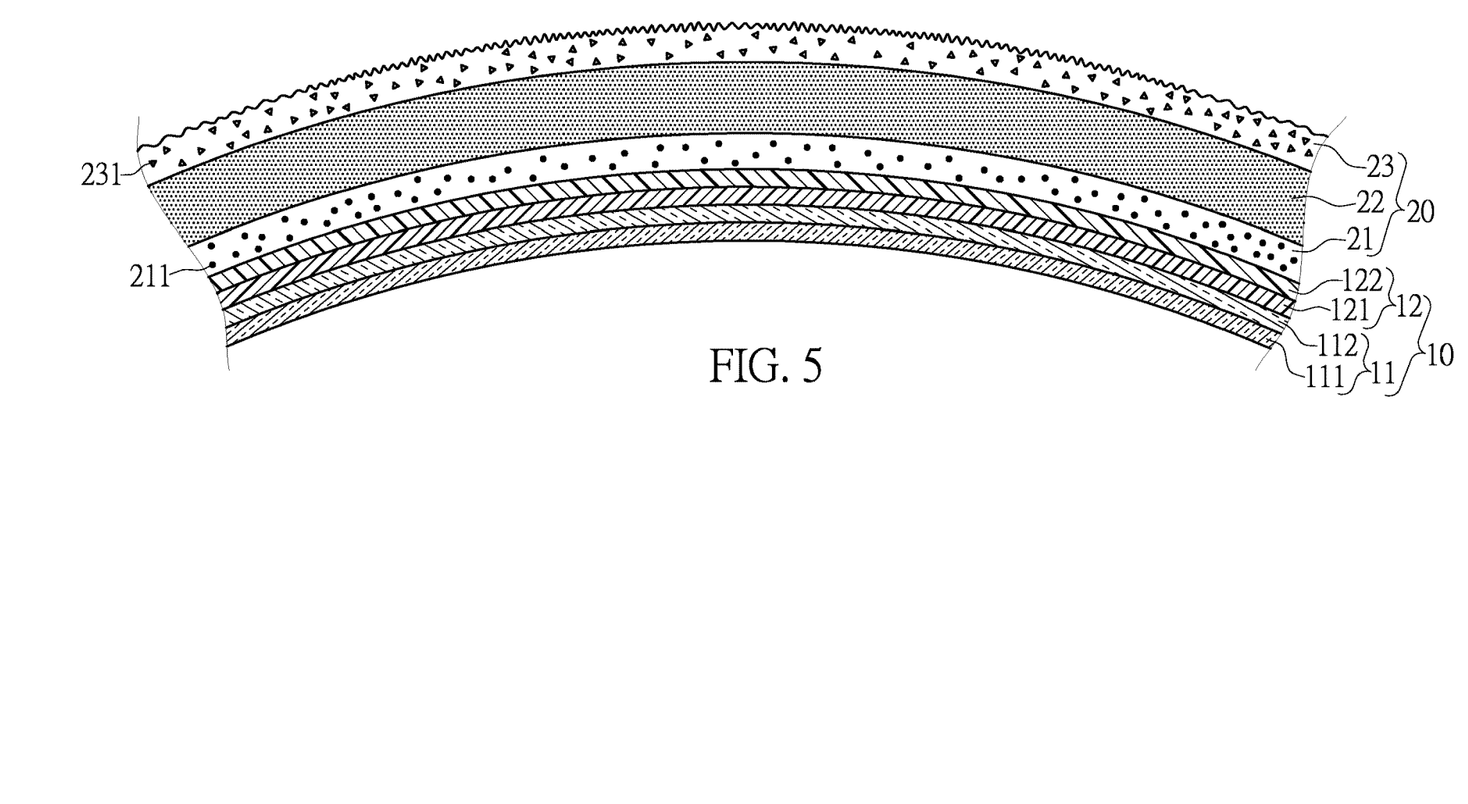
FIG. 5 is a schematic view of the touch display leather of FIG. 3 that is in a curved state.

Furthermore, the backlight module 11 is configured to selectively provide a light source L for displaying a display signal as shown in FIG. 4. The backlight module 11 includes a backlight unit 111 and a light guide film 112, and the light guide film 112 is disposed on a side surface of the backlight unit 111. The backlight unit 111 can provide the light source L, and the light guide film 112 allows the light source L to penetrate there-through.

In various embodiments of the present disclosure, the backlight unit 111 is at least one of a light emitting diode (LED), an organic light emitting diode (OLED), and an electroluminescent (EL) light panel, but the present disclosure is not limited thereto. As long as the light unit is a backlight unit that can be applied to a touch structure and can provide a light source, said light unit falls within the scope of the present disclosure.

In various embodiments of the present disclosure, a surface of the light guide film 112 has an optical microstructure to produce a light guide effect. Furthermore, the light guide film 112 includes at least one material selected from the group consisting of poly(methyl-methacrylate) (PMMA) and polycarbonate (PC), but the present disclosure is not limited thereto. As long as the film is a light guide film suitable for producing a light guide effect in a touch structure, said film falls within the scope of the present disclosure.

Further referring to FIG. 3 and FIG. 4, the touch module 12 is disposed on the backlight module 11, and the touch module 12 is configured to provide a touch function.

More specifically, in the touch structure 10, the touch module 12 further includes a base film 121 and an electrically conductive pattern 122, and the electrically conductive pattern 122 is formed on a side surface of the base film 121 so as to provide the touch function.

In the present embodiment, the electrically conductive pattern 122 is disposed on a side surface of the base film 121 away from the backlight unit 111, but the present disclosure is not limited thereto. For example, in an embodiment not shown in the present disclosure, the electrically conductive pattern 122 may also be disposed on a side surface of the base film 121 close to the backlight unit 111 so as to provide the touch function.

In various embodiments of the present disclosure, the base film 121 includes at least one material selected from the group consisting of polyester (i.e., PET) and polycarbonate (PC). It should be noted that the term "polyester" usually refers to polyethylene terephthalate (PET). The material of the base film 121 of the present disclosure is not limited to the above-mentioned embodiments. As long as the film includes a material that can be used as a base film in a touch structure, said film falls within the scope of the present disclosure.

Furthermore, the electrically conductive pattern 122 may be, for example, formed by printing a conductive ink (not labeled) on the base film 121. In a preferred embodiment of the present disclosure, the conductive ink is a transparent conductive ink to improve the light transmission characteristics of the touch module 12.

Further referring to FIG. 3 and FIG. 4, the leather structure 20 includes a diffusion layer 21, a foam layer 22, and a fabric layer 23 stacked in sequence.

More specifically, the diffusion layer 21 is disposed on a side surface of the touch module 12 away from the backlight module 11, and the diffusion layer 21 includes optical powder 211 dispersed therein to optically diffuse the light source L provided by the backlight module 11. The foam layer 22 is disposed on a side surface of the diffusion layer 21 away from the backlight module 11, and the foam layer 22 is foamed to provide a leather feel. Furthermore, the fabric layer 23 is disposed on a side surface of the foam layer 22 away from the backlight module 11, and the fabric layer is color-matched and embossed to present a leather pattern 232.

It should be noted that although the leather structure 20 of the present embodiment is collocated with the touch structure 10 for illustration, the actual application of the leather structure 20 is not limited thereto. For example, the leather structure 20 can also be a product sold independently, and can be applied to other types of electronic components, especially an electronic component that can provide a light source.

According to the above configuration, a main feature of the present disclosure is that the leather structure 20 has a specially designed three-layer stacked structure to produce balanced light transmittance and shielding properties.

As shown in FIG. 2 and FIG. 4, when the backlight module 11 selectively provides the light source L, the light source L is capable of sequentially passing through the touch module 12, the diffusion layer 21, the foam layer 22, and the fabric layer 23 to present a display signal 233 on the fabric layer. It is worth mentioning that the optical powder 211 dispersed in the diffusion layer 21 is capable of optically diffusing the light source L so as to produce an effect of atmospheric lighting. That is, the introduction of the optical powder 211 can improve an effect of light diffusion, so that a pearlescent effect can be increased, and a light color can be adjusted.

In addition, as shown in FIG. 1 and FIG. 3, when the backlight module 11 does not provide the light source L, the leather structure 20 is capable of shielding the touch structure 10, and the leather structure 20 is capable of presenting the leather pattern 232 through the fabric layer 23. In other words, the leather structure 20 can produce a shielding effect when the backlight module 11 is not activated.

Furthermore, in various embodiments of the present disclosure, base materials of the diffusion layer 21, the foam layer 22, and the fabric layer 23 of the leather structure 20 are all at least one material selected from the group consisting of polyvinyl chloride (PVC), polyurethane (PU), and polyolefin (PO), so that the leather structure 20 can have good light transmittance.

It should be noted that the term "base material" used in the present disclosure refers to a material that occupies at least 50% of the total content of a layered structure, so that the base material can be presented as a continuous medium and exhibit its material characteristics (i.e., light transmittance).

In various embodiments of the present disclosure, the leather structure 20 generally has a light transmittance between 2% and 30%, preferably between 3% and 10%, and more preferably between 5% and 7%, but the present disclosure is not limited thereto.

In order to provide good optical diffusion effect and light transmittance, the diffusion layer 21 generally has a thickness between 2 μm and 200 μm, and preferably between 50 μm and 100 μm.

In various embodiments of the present disclosure, the optical powder 211 in the diffusion layer 21 is at least one material selected from the group consisting of diffusion powder (i.e., light diffusion powder), pearl powder, and phosphor powder.

In addition, the optical powder 211 in the diffusion layer 21 generally has an average particle size between 0.5 μm and 5.0 μm, and preferably between 1.0 μm and 3.0 μm.

Further, a content range of the optical powder 211 in the diffusion layer 21 is generally between 1.0 wt % and 30.0 wt %, and preferably between 1.0 wt % and 15.0 wt %.

According to the above configuration, the diffusion layer 21 can provide good optical diffusion effect and light transmittance.

In order to provide good leather feel and light transmittance, the foam layer 22 includes a material foamed by a foaming agent (e.g., PU foaming agent, PVC foaming agent).

Further, a ratio of a thickness of the foam layer 22 after being foamed to a thickness of the foam layer 22 before being foamed is defined as a foaming ratio, and the foaming ratio of the foam layer 22 is between 105% and 180%, and preferably between 130% and 150%.

The foam layer 22 has a thickness between 50 μm and 400 μm after being foamed, and preferably between 200 μm and 400 μm.

According to the above configuration, the foam layer 22 can provide good leather feel and light transmittance.

In order to provide an appearance of leather, the fabric layer 23 has a thickness between 10 μm and 200 μm, and preferably between 50 μm and 100 μm.

The fabric layer 23 includes a color dye 231 dispersed therein. The color dye 231 may be, for example, at least one of an inorganic color material and an organic color material. In a preferred embodiment of the present disclosure, the color dye 231 is a dye having low opacity, such as a dye having a nanometer particle size or a dye having a sub-nanometer particle size.

In the fabric layer 23, a content range of the color dye 231 is generally not greater than 30 wt %, preferably between 3 wt % to 25 wt %, and more preferably between 5 wt % and 10 wt %.

The color dye 231 generally has an average particle size between 0.05 μm and 1.50 μm, and preferably between 0.2 μm and 0.7 μm.

Furthermore, a side surface of the fabric layer 23 away from the foam layer 22 is embossed or engraved, so that the fabric layer 23 is color-matched and embossed to present the leather pattern 232.

According to the above configuration, the fabric layer 23 can provide the visual effect of leather and have good light transmittance.

Leather Structure of Touch Display Leather

As mentioned above, the leather structure 20 can also be a product sold independently, and can be applied to other types of electronic components, especially electronic components that can provide a light source.

Figure 6:
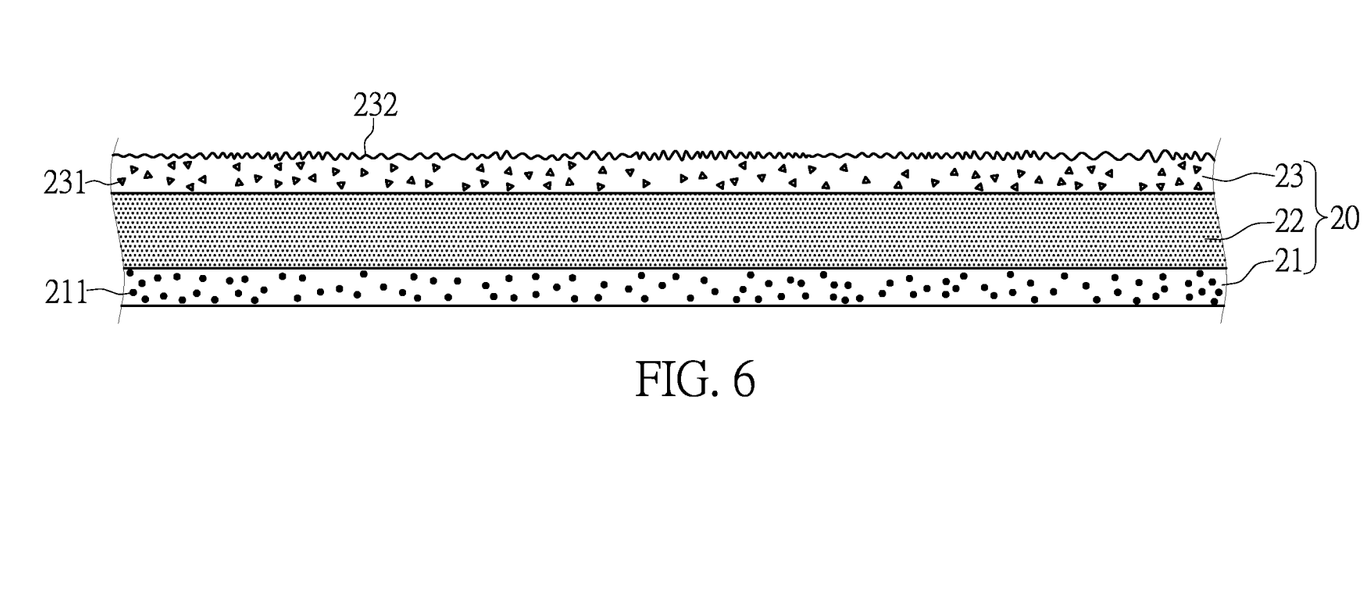
FIG. 6 is a cross-sectional view of a leather structure according to an embodiment of the present disclosure.

As shown in FIG. 6, a leather structure 20 is also provided in the present embodiment. The leather structure 20 includes a diffusion layer 21, a foam layer 22, and a fabric layer 23 stacked in sequence. The diffusion layer 21 includes optical powder 211 dispersed therein. The foam layer 22 is disposed on the diffusion layer 21, and the foam layer 22 is foamed to provide a leather feel. The fabric layer 23 is disposed on the foam layer 22, and the fabric layer 23 is color-matched and embossed to present a leather pattern.

Base materials of the diffusion layer 21, the foam layer 22, and the fabric layer 23 are all at least one material selected from the group consisting of polyvinyl chloride (PVC), polyurethane (PU), and polyolefin (PO), and the leather structure 20 has a light transmittance between 2% and 30%.

BENEFICIAL EFFECTS OF THE EMBODIMENTS

In conclusion, by virtue of "the structural design, material design, and connection relationship of the touch structure and the leather structure", the touch display leather has balanced light transmittance and shielding properties, thereby greatly improving applicability of product.

Further, since the touch structure is a flexible touch structure and the leather structure is a flexible leather structure, the touch display leather as a whole has flexibility and can be disposed on a curved object, such as a door trim, a roof, and a front seat back of an automobile, or the touch display leather can be disposed on a curved portion of a wallet or a bag.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A touch display leather, comprising:
   a touch structure including:
      a backlight module being configured to selectively provide a light source for displaying a display signal; and
      a touch module being disposed on the backlight module, and the touch module including an electrically conductive pattern to provide a touch function; and
   a leather structure including:
      a diffusion layer being disposed on the touch module, and the diffusion layer including optical powder dispersed therein;
      a foam layer being disposed on the diffusion layer, and the foam layer being foamed to provide a leather feel; and
      a fabric layer being disposed on the foam layer, and the fabric layer being color-matched and embossed to present a leather pattern;
   wherein, when the backlight module selectively provides the light source, the light source is capable of sequentially passing through the touch module, the diffusion layer, the foam layer, and the fabric layer to present the display signal on the fabric layer; and the optical powder dispersed in the diffusion layer is capable of optically diffusing the light source;
   wherein, when the backlight module does not provide the light source, the leather structure is capable of shielding the touch structure, and the leather structure is capable of presenting the leather pattern through the fabric layer.

2. The touch display leather according to claim 1, wherein the touch structure is a flexible touch structure and the leather structure is a flexible leather structure, so that the touch display leather is capable of being disposed on a curved object.

3. The touch display leather according to claim 1, wherein, in the leather structure, base materials of the diffusion layer, the foam layer, and the fabric layer are all at least one material selected from the group consisting of polyvinyl chloride (PVC), polyurethane (PU), and polyolefin (PO), and the leather structure has a light transmittance between 2% and 30%.

4. The touch display leather according to claim 3, wherein the diffusion layer has a thickness between 2 μm and 200 μm, and the optical powder in the diffusion layer is at least one material selected from the group consisting of diffusion powder, pearl powder, and phosphor powder.

5. The touch display leather according to claim 4, wherein an average particle size of the optical powder in the diffusion layer is between 0.5 μm and 5.0 μm, and a content range of the optical powder in the diffusion layer is between 1.0 wt % and 30.0 wt %.

6. The touch display leather according to claim 3, wherein the foam layer is a foamed material; wherein a ratio of a thickness of the foam layer after being foamed to a thickness of the foam layer before being foamed is defined as a foaming ratio, and the foaming ratio of the foam layer is between 105% and 180%; wherein the foam layer has a thickness between 50 μm and 400 μm after being foamed.

7. The touch display leather according to claim 3, wherein the fabric layer has a thickness between 10 μm and 200 μm, the fabric layer includes a color dye dispersed therein, a content range of the color dye in the fabric layer is not greater than 30 wt %, and a side surface of the fabric layer away from the foam layer is embossed or engraved, so that the fabric layer is color-matched and embossed to present the leather pattern.

8. The touch display leather according to claim 1, wherein, in the touch structure, the backlight module includes a backlight unit and a light guide film disposed on a side surface of the backlight unit; wherein the backlight unit is at least one of a light emitting diode (LED), an organic light emitting diode (OLED), and an electroluminescent (EL) light panel, and the light guide film includes at least one material selected from the group consisting of poly(methyl-methacrylate) (PMMA) and polycarbonate (PC).

9. The touch display leather according to claim 1, wherein, in the touch structure, the touch module further includes a base film, and the electrically conductive pattern is formed on a side surface of the base film; wherein the base film includes at least one material selected from the group consisting of polyester (PET) and polycarbonate (PC), and the electrically conductive pattern is formed by printing a conductive ink.

* * * * *